United States Patent [19]  [11] Patent Number: 4,799,933
Beffa et al.  [45] Date of Patent: Jan. 24, 1989

[54] PROCESS FOR THE TRICHROMATIC DYEING OF LEATHER

[75] Inventors: Fabio Beffa, Riehen; Josef Koller, Reinach, both of Switzerland

[73] Assignee: Ciba-Geigy Corporation, Ardsley, N.Y.

[21] Appl. No.: 2,361

[22] Filed: Jan. 12, 1987

[30] Foreign Application Priority Data

Jan. 21, 1986 [CH] Switzerland ............................ 221/86

[51] Int. Cl.$^4$ .......................... D06P 1/10; D06P 3/30; D06P 3/32
[52] U.S. Cl. ............................................ 8/404; 8/436; 8/437; 8/639
[58] Field of Search ................... 8/404, 436, 437, 639

[56] References Cited

U.S. PATENT DOCUMENTS 4,427,411 1/1984 Püntener ................................. 8/404
4,452,602 6/1984 Püntener ................................. 8/404

FOREIGN PATENT DOCUMENTS 2158085 11/1985 United Kingdom .

Primary Examiner—Paul Lieberman
Assistant Examiner—John F. McNally
Attorney, Agent, or Firm—Edward McC. Roberts; Meredith C. Findlay

[57] ABSTRACT

A mixture comprising a yellow dye and a red dye each of formula I and a grey dye of formula II is employed in accordance with claim 1 for the trichromatic dyeing of leather.

19 Claims, No Drawings

PROCESS FOR THE TRICHROMATIC DYEING OF LEATHER

A process for the trichromatic dyeing of leather is known from published European patent application 61 670. In particular 1:2-chromium or 1:2-cobalt complexes of azo or azomethane dyes are employed in said process.

It has now been found that 1:2-chromium complexes of azo dyes of formula II below are particularly suitable as blue or grey dyes for the trichromatic dyeing of leather. Surprisingly, irrespective of the type of leather, trichromatic mixtures containing said dyes produce level dyeings which are distinguished by a particularly good lightfastness.

The present invention relates to a process for dyeing leather with a mixture comprising a yellow, a red and a blue dye, said yellow dye and said red dye each being of the formula

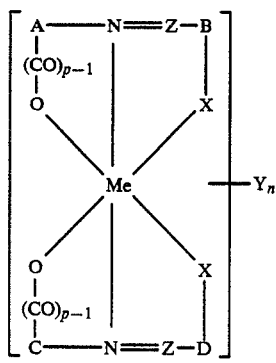
(I)

wherein the substituents Z are each independently of the other nitrogen or a CH group, A and C are each independently of the other a radical of the benzene or naphthalene series, which radical carries a hydroxyl or carboxyl group in the o-position to the zo or azomethine group, B and D are each independently of the other the radical of a coupling component if Z is nitrogen, which coupling component carries the group X in the o- or α-position to the azo group, or are each independently of the other the radical of an o-hydroxyaldehyde if Z is the CH group, the substituents X are each independently of the other oxygen or a group of the formula —NR—, in which R is hydrogen or a $C_1$–$C_4$alkyl group, Me is chromium or cobalt, Y is the $SO_3H$, COOH or $PO_3H_2$ group, p is 1 or 2 and n is an integer from 1 to 6, which process comprises the use of an aqueous dye bath which contains a grey dye of the formula

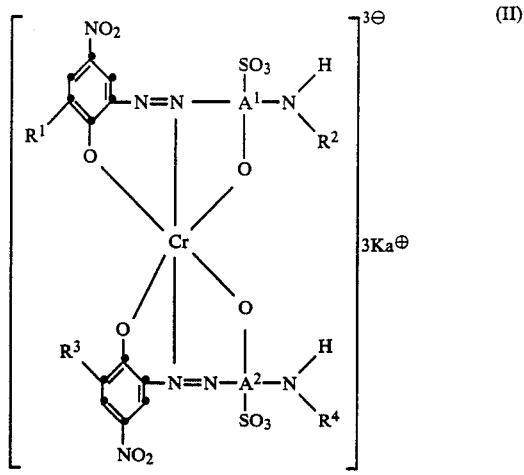
(II)

wherein $R^1$ and $R^3$ are each independently of the other hydrogen or sulfo, $A^1$ and $A^2$ are each independently of the other the radical of 1-hydroxynaphthalene or 2-hydroxynaphthalene, $R^2$ and $R^4$ are each independently of the other hydrogen or a group of the formula —CO—(O)$_m$—E, in which E is $C_1$–$C_5$alkyl and m is 0 or 1, and $Ka^\oplus$ is a cation.

Yellow dyes shall be understood as meaning all dyes of yellow shade, e.g. yellowish brown or reddish or greenish yellow dyes. Orange to reddish brown dyes shall be referred to collectively as red dyes and blue, grey or violet dyes shall be referred to as blue dyes.

$Ka^\oplus$ is a cation, for example an alkali metal cation such as lithium, potassium or, preferably, sodium. $Ka^\oplus$ may also be an ammonium cation or the ammonium salt of an organic amine.

The radicals $A^1$ and $A^2$ are preferably derived from 1-hydroxy-3-sulfonaphthalene or from 2-hydroxy-4-sulfonaphthalene and the —$NHR^2$ and —$NHR^4$ groups are preferably in the 6- or 7-position of these compounds.

$R^2$ and $R^4$ may be different but are preferably identical. Examples of suitable groups $R^2$ and $R^4$ are: hydrogen, acetyl, propionyl, butryryl, isobutyryl, valeryl, isovaleryl, pivaloyl, capronyl, methoxycarbonyl, ethoxycarbonyl, propoxycarbonyl or n-pentoxycarbonyl. The preferred meanings of $R^2$ and $R^4$ are hydrogen, acetyl, propionyl, methoxycarbonyl or ethoxycarbonyl, with hydrogen or acetyl being most preferred.

Particularly preferred radicals $A^1$ and $A^2$ are derived from 1-hydroxy-7-aminonaphthalene-3-sulfonic acid, 1-hydroxy-6-aminonaphthalene-3-sulfonic acid, 2-hydroxy-6-aminonaphthalene-4-sulfonic acid or from the corresponding acetylamino compounds.

Particularly preferred grey dyes are the 1:2-chromium complex of the dye of the formula

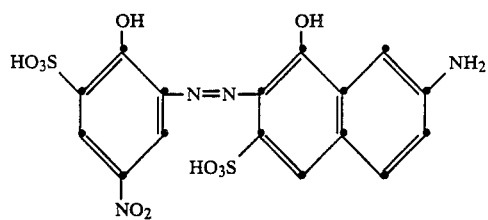

and, most preferably, the 1:2-chromium complex of the dye of the formula

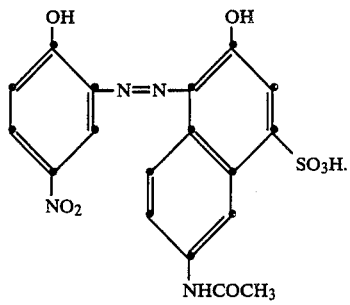

The dyes of formula II, III or IV are employed together with a yellow dye and a red dye each of formula I.

The dyes of formulae I to IV are of anionic nature and are advantageously employed in the form of their salts, preferably alkali metal salts, e.g. lithium, potassium or sodium salts, or ammonium salts. Ammonium salts shall also be understood as meaning salts of organic amines, e.g. of amines which are substituted by $C_1$–$C_6$alkyl or hydroxy-$C_1$–$C_6$alkyl groups.

Suitable dyes of formula I are both symmetric and asymmetric 1:2-azo or 1:2-azo-methine complexes, and also 1:2-complexes containing an azo or an azomethine dye attached to the metal.

It is preferred to employ dyes of formula I wherein X is oxygen.

If the dyes of formula I contain more than one group Y, then said groups Y may be identical or different, i.e. the dyes may contain sulfonic acid groups and/or carboxylic acid group and/or phosphonic acid groups. Preferably, all groups Y are $SO_3$—H groups.

It is also preferred to employ dyes of formula I wherein p is 1, and also dyes of formula I wherein n is 1 to 3, preferably 2.

The radicals A and C may carry one or more carboxylic, phosphonic or sulfonic acid groups and may also be further substituted, preferably by $C_1$–$C_4$alkyl, $C_1$–$C_4$alkoxy, chlorine or nitro.

Examples of suitable diazo components A and C are: anthranilic acid, 4- or 5-sulfoanthranilic acid, 2-amino-1-hydroxybenzene, 4-chloro- and 4,6-dichloro-2-amino-1-hydroxybenzene, 4- or 5-nitro-2-amino-1-hydroxybenzene, 4-chloro- and 4-methyl-6-nitro-2-amino-1-hydroxybenzene, 6-chloro-4-nitro-2-amino-1-hydroxybenzene, 4-cyano-2-amino-1-hydroxybenzene, 4-methoxy-2-amino-1-hydroxybenzene, 4-methoxy-5-chloro-2-amino-1-hydroxybenzene, 4-methyl-2-amino-1-hydroxybenzene, 4-chloro-5-nitro-2-aminohydroxybenzene, 3,4,6-trichloro-2-amino-1-hydroxybenzene, 4,6-dinitro-2-amino-1-hydroxybenzene, 2-amino-1-hydroxybenzene-4- or -5-sulfonic acid, 4-nitro-2-amino-1-hydroxy-benzene-6-sulfonic acid, 5-nitro- or 6-nitro-2-amino-1-hydroxybenzene-4-sulfonic acid, 6-chloro-2-amino-1-hydroxybenzene-4-sulfonic acid, 4-chloro-2-amino-1-hydroxybenzene-6-sulfonic acid, 1-amino-2-hydroxynaphthalene-4-sulfonic acid, 1-amino-2-hydroxy-6-nitronaphthalene-4-sulfonic acid or 2-amino-1-hydroxybenzene-4,6-disulfonic acid, 1-amino-2-hydroxybenzene-4-sulfonamide or 4-methylsulfonyl-2-amino-1-hydroxybenzene.

Preferably, A and C are each independently of the other the radical of a 1-hydroxy-2-aminobenzene which is unsubstituted or substituted by one or more identical or different substituents selected from the series consisting of nitro, sulfo, chlorine, methyl or methoxy, or, most preferably, are the radical of a 1-hydroxy-2-aminobenzene which carries a nitro group in the 4- or 5-position, or are the radical of a 1-hydroxy-2-aminobenzene which carries a nitro group in the 4-position and a sulfo group in the 6-position, or are the radical of a 1-hydroxy-2-aminobenzene which carries a sulfo group in the 4-position and a nitro group in the 6-position.

The radicals B and D are preferably derived from the following groups of coupling components: phenols which couple in the orthoposition and which are unsubstituted or substituted by low molecular alkyl or alkoxy, amino or acylamino, where acylamino denotes $C_1$–$C_4$alkanoylamino, $C_1$–$C_4$alkylsulfonylamino, $C_1$–$C_4$alkoxycarbonylamino, aroylamino or arylsulfonylamino radicals; resorcinol; m-phenylenediamine, unsubstituted or substituted in the 4-position by sulfo, chloro, methyl or methoxy; naphthols which are unsubstituted or substituted by $C_1$–$C_4$alkyl or $C_1$–$C_4$alkoxy, chlorine, amino, acylamino or sulfo, where acylamino is as defined above; 5-pyrazolones or 5-aminopyrazoles, which carry in the 1-position a phenyl or naphthyl radical, each unsubstituted or substituted by chlorine, nitro, $C_1$–$C_4$alkyl or $C_1$–$C_4$alkoxy groups or sulfo groups, and in the 3-position carry a $C_1$–$C_4$alkyl group, preferably a methyl group; acetoacetamides, acetoacetanilides and benzoylacetanilides which may be substituted in the anilide nucleus by chlorine, $C_1$–$C_4$alkyl or $C_1$–$C_4$alkoxy groups or sulfo groups; or 6-hydroxy-3-cyano- or 6-hydroxy-3-carbamoyl-4-alkyl-2-pyridones which are substituted in the 1-position by unsubstituted or substituted $C_1$–$C_4$alkyl, for example methyl, isopropyl, $\beta$-hydroxyethyl, $\beta$-aminoethyl or $\gamma$-isopropoxypropyl, or by phenyl, and in the 4-position can carry a $C_1$–$C_4$alkyl group, preferably methyl.

Examples of such coupling components are: 2-naphthol, 1,3- or 1,5-dihydroxynaphthalene, 1-naphthol, 1-acetylamino-7-naphthol, 1-propionylamino-7-naphthol, 1-carboxymethoxyamino-7-naphthol, 1-carboethoxyamino-7-naphthol, 1-carbopropoxyamino-7-naphthol, 6-acetyl-2-naphthol, 2-naphthol-3-, -4-, -5-, -6-, -7- or -8-sulfonic acid, 1-naphthol-3-, -4- or -5-sulfonic acid, 1-naphthol-3,6-disulfonic acid, 1-naphthol-4,8-disulfonic acid, 1-naphthol-3,8-disulfonic acid, 2-naphthol-3,6-disulfonic acid, 4-methyl-1-naphthol, 4-methoxy-1-naphthol, 4-acetyl-1-naphthol, 5,8-dichloro-1-naphthol, 5-chloro-1-naphthol, 2-naphthylamine, 2-naphthylamine-1-sulfonic acid, 1-naphthylamine-4- or -5-sulfonic acid, 2-aminonaphthylene-6-sulfonic acid, 2-aminonaphthalene-5-sulfonic acid, 1-phenyl-3-methylpyrazol-5-one, 1-phenyl-5-pyrazolone-3-carboxamide, 1-(2'-, 3'- or 4'-methylphenyl)-3-methylpyrazol-5-one, 1-(2'-, 3'- or 4'-sulfophenyl)-3-methylpyrazol-5-one, 1-(2'-chloro-5'-sulfophenyl)-3-methylpyrazol-5-one, 1-(2'- or 4'-methoxyphenyl)-3-methylpyrazol-5-one, 1-(2'-, 3'- or 4'-chlorophenyl)-3-methylpyrazol-5-one, 1-(2'-, 3'- or 4'-nitrophenyl)-3-methylpyrazol-5-one, 1-(2',5'- or 3',4'-dichlorophenyl)-3-methylpyrazol-5-one, 1-(2',5'-dichloro-4'-sulfophenyl)-3-methylpyrazol-5-one, 1-(2'-, 3'- or 4'-sulfophenyl)-3-methyl-5-aminopyrazole, 1-(2'-chloro-5'-sulfophenyl)-3-methyl-5-aminopyrazole, acetoacetanilide, acetoacetanilide-2-, -3- or -4-sulfonic acid, acetoacet-o-anisidide, acetoacet-o-toluidide, acetoacet-o-chloroanilide, acetoacet-m-xylidide, tetralol, 4-methylphenyl, 3-dialkylaminophenols, preferably 3-dimethylamino- and 3-diethylaminophenol, 4-butylphenyl, 4-amylphenol, most preferably 4-tert-amylphenol, 2-isopropyl-4-methylphenol, 2- or 3-acetylamino-4-methylphenol, 2-methoxycarbonylamino-4-methylphenol, 2-ethoxycarbonylamino-4-methylphenol and 3,4-dimethylphenol, resorcinol, 1-ethyl-3-cyano-4-methyl-6-hydroxypyridone, 1-methyl-3-cyano-4-methyl-6-hydroxypyridone, 1-phenyl-3-carbamoyl-4-methyl-6-hydroxypyridone.

Preferred meanings of B and D are: a 1- or 2-naphthol which is unsubstituted or substituted by a sulfo group, or m-phenylenediamine, resorcinol, p-$C_1$-$C_6$alkylphenol, 1-phenyl-3-methyl-5-pyrazolone or acetoacetanilide, the phenyl moiety of which last two compounds may be substituted by $C_1$-$C_4$alkyl, $C_1$-$C_4$alkoxy, chlorine or sulfo.

If Z is the CH group, then B or D is the radical of an o-hydroxyaldehyde, preferably the radical of an o-hydroxybenzaldehyde or o-hydroxynaphthaldehyde. Examples of suitable aldehydes are: 2-hydroxy-1-naphthaldehyde, 1-hydroxy-2-naphthaldehyde, 2-hydroxybenzaldehyde, 3- and 5-methyl-2-hydroxybenzaldehyde, 3,5-dimethyl-2-hydroxybenzaldehyde, 5-butyl-2-hydroxybenzaldehyde, 5-chloro- or 5-bromo-2-hydroxybenzaldehyde, 3-chloro-2-hydroxybenzaldehyde, 3,5-dichloro-2-hydroxybenzaldehyde, 5-sulfo-2-hydroxybenzaldehyde, 3-methyl-5-chloro-2-hydroxybenzaldehyde, 5-(phenylazo)-2-hydroxybenzaldehyde, 5-(2',3'- or 4'-sulfophenylazo)-2-hydroxybenzaldehyde or 5-(6'-sulfonaphthyl-1'-azo)-2-hydroxybenzaldehyde.

Preferably, each of the dyes of formula I employed is a symmetric 1:2-metal complex containing 2 sulfo groups.

On account of the fact that they are readily accessible and can be combined well with the dyes of formulae II to IV, in the process of the present invention in particular dye mixtures in which the yellow dye and the red dye are each of the formula

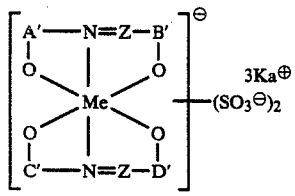

are employed, in which formula V
the substituents Z are each independently of the other nitrogen or a CH group,
A' and C' are each the radical of a 1-hydroxy-2-aminobenzene which carries a nitro group in the 4- or 5-position, or are the radical of a 1-hydroxy-2-aminobenzene which carries a nitro group in the 4-position and a sulfo group in the 6-position, or are the radical of a 1-hydroxy-2-aminobenzene which carries a nitro group in the 6-position and a sulfo group in the 4-position, B' and D' are each independently of the other the radical of one of the following coupling components if Z is nitrogen: 1- or 2-naphthol which is unsubstituted or substituted by a sulfo group, or m-phenylenediamine, resorcinol, p-$C_1$-$C_6$-alkylphenol, 1-phenyl-3-methyl-5-pyrazolone or acetoacetanilide, the phenyl moiety of which last two compounds may be substituted by $C_1$-$C_4$alkyl, $C_1$-$C_4$alkoxy, chlorine or sulfo, or, if Z is the CH group, are each independently of the other the radical of an o-hydroxybenzaldehyde or o-hydroxynaphthaldehyde, each of which may be substituted by phenylazo or sulfophenylazo,
Me is cobalt or chromium and
$Ka^\oplus$ is a cation.

It is preferred to employ a dye mixture containing
(a) a grey 1:2 chromium complex of formula II above,
(b) a red or reddish brown 1:2-chromium or 1:2-cobalt complex of the dye of the formula

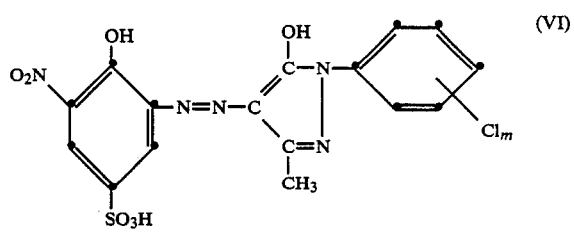

wherein m is an integer from 0 to 2, and
(c) a yellow 1:2-cobalt complex of the dye of the formula

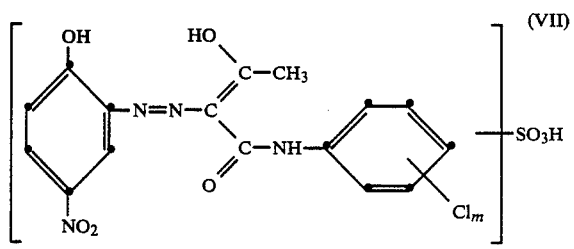

wherein m is as defined above, or a yellowish brown 1:2-cobalt or 1:2-chromium complex of the dye of the formula

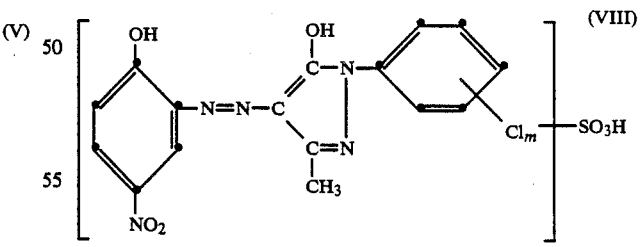

wherein m is as defined above.

The amounts in which the dyes to be used in accordance with the invention are employed in the dye baths can vary within wide limits, depending on the intensity of shade required. In general, amounts of dye in the range from 0.1 to 10% by weight, preferably from 0.5 to 4% by weight, based on the weight of the leather to be dyed, are advantageous.

In addition to containing water and the dyes, dye bath may also contain further additives, e.g. acids, bases or salts for the purpose of adjusting the pH to the desired value, and also assistants such as wetting agents, fatliquoring agents, colour-intensifying assistants and/or anti-foams.

The process of the present invention has the great advantage that it is not only suitable for one specific type of leather, but can be applied to a very wide variety of types of leather, e.g. chrome leather, retanned leather or suède leather made of goatskin, cowhide, sheepskin or pigskin, and also furs. The dyeings obtained are distinguished by good fastness to light and wetting. Since the dyes employed have similar depths of penetration on leather, the fastness to buffing of the dyeings obtained is good, i.e. when buffing the leather, practically no difference in shade between the surface of the leather and its inner layers is discernible.

Dyeing is preferably effected by the exhaust method, e.g. in a liquor to goods ratio in the range from 1:1.5 to 1:20, preferably from 1:2 to 1:10, and in the temperature range from 20° to 100° C., preferably from 40° to 60° C. If desired or necessary, the leather may be pretreated, e.g. neutralised or milled.

The dyeing time depends on the type of leather and on the desired intensity of shade, and is in general from 45 to 180 minutes. After the dyeing, the leather is rinsed and finished in a customary manner.

The invention is illustrated by the following non-limitative Examples. Parts and percentages are by weight, based on the weight of the leather.

EXAMPLE 1

100 parts of chrome-tanned leather made of cowhide are washed for 10 minutes at 30° C. and at 24 rpm in 300 parts of water. The washing water is then drained off and replaced by a bath which consists of 400 parts of water of 30° C., 1 part of sodium formiate and 1 part of sodium bicarbonate. After a neutralisation time of 45 minutes, the leather is again washed in 300 parts of water of the same temperature.

The leather which has been neutralised in this manner is subsequently dyed in 300 parts of water at 50° C. with a dye mixture comprising 0.072 parts of the yellow dye of the formula

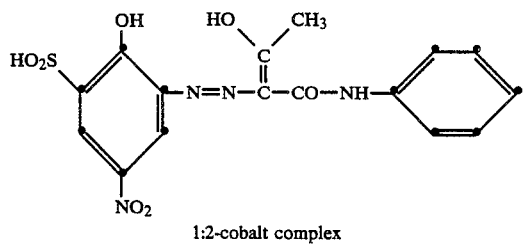

1:2-cobalt complex 0.123 parts of the red dye of the formula

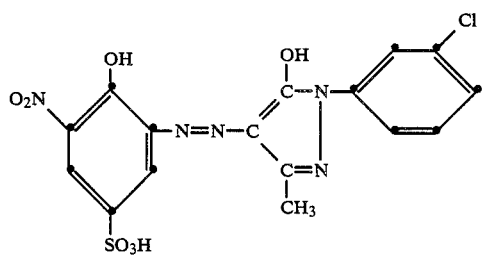

-continued
1:2-chromium complex and 0.21 parts of the grey dye of the formula

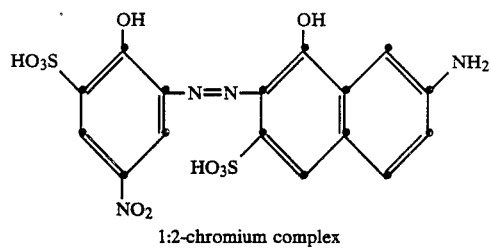

1:2-chromium complex

After 30 minutes, 3 parts of a fatliquoring agent based on sulfonated chloroparaffins are added to the dye bath, followed, after a further 30 minutes, by the addition of 0.5 parts of 85% formic acid. The leather is then further treated for 20 minutes, then rinsed in cold water and finished in a customary manner.

A level reddish brown dyeing with good lightfastness is obtained on the leather. By means of enlarged cross-sectional photos, it can be established that the three days have a very balanced dyeing power. Accordingly, when buffing the leather, practically no difference in shade between the surface of the leather and its inner layers is discernible.

EXAMPLE 2

100 parts of chrome-tanned leather made of cowhide, which has been washed and neutralised as described in Example 1 with sodium formiate and sodium bicarbonate, are retanned for 60 minutes at 30° C. in 300 parts of an aqueous bath which contains 6 parts of a synthetic tanning agent based on formaldehyde condensation products containing phenolic sulfonic acids. After the retanning, the leather is washed for 10 minutes in 300 parts of water at 30° C.

The retanned leather is dyed in the same manner as described in Example 1, except that a dye mixture comprising 0.228 parts of the yellow dye, 0.072 parts of the red dye and 0.60 parts of the grey dye is employed, said three dyes being those used in Example 1. After 30 minutes' dyeing at 50° C., 3 parts of fatliquoring agent based on sulfonated chloroparaffins are likewise added, followed, after a further 30 minutes, by the addition of 1 part of 85% formic acid. The leather is then further treated for 20 minutes, then thoroughly rinsed in cold water and finished in a customary manner.

An olive-brown dyeing with excellent levelness and lightfastness is obtained on the leather. Moreover, like the dyeing of Example 1, the dyeing of Example 2 is distinguished by a good fastness to buffing.

EXAMPLES 3 TO 8

By following the procedure described in either of Examples 1 or 2 but using instead of the grey dye employed therein the same amounts of one of the grey dyes inidicated in the following table, reddish brown or olive-brown dyeings with very good fastness to light and buffing are also obtained.

| Ex. | Grey dye |
|---|---|
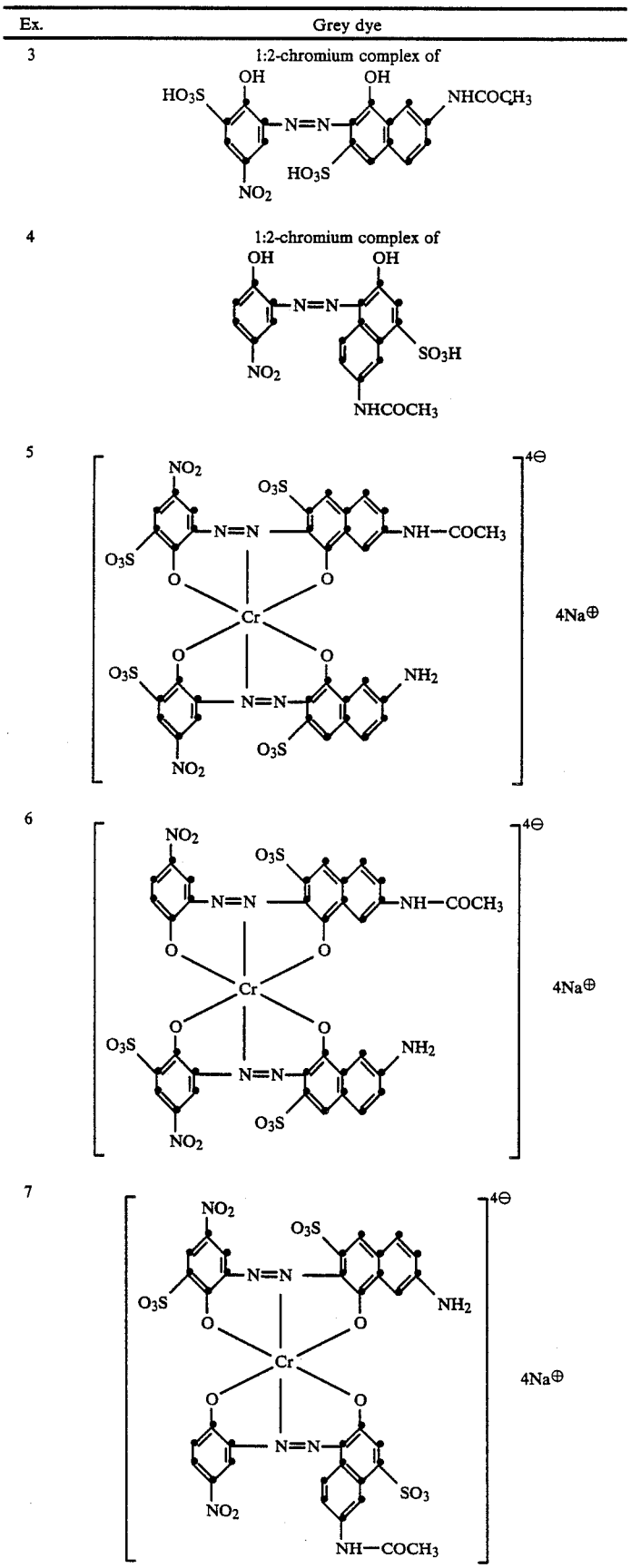

| Ex. | Grey dye |
|---|---|
| 8 | 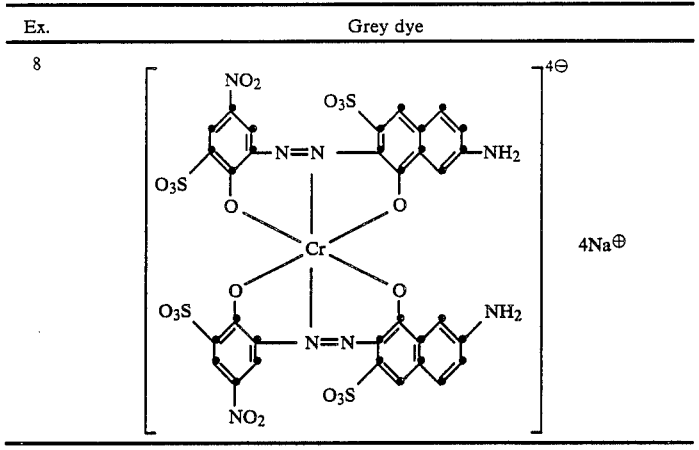 |

What is claimed is:

1. A process for the trichromatic dyeing of leather, comprising the step of contacting the leather with an aqueous dyebath which contains a red and a yellow dye, each of formula I

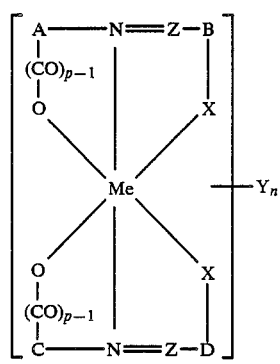

(I)

wherein
the substituents Z are each independently of the other nitrogen or a CH group,
A and C are each independently of the other a radical of the benzene or naphthalene series, which radical carries a hydroxyl or carboxyl group in the o-position to the azo or azomethine group,
B and D are each independently of the other the radical of a coupling component if Z is nitrogen, which coupling component carries the group X in the o- or alpha-position to the azo group, or are each independently of the other the radical of an o-hydroxyaldehyde if Z is the CH group,
the substituents X are each independently of the other oxygen or a group of the formula —NR—, in which R is hydrogen or a $C_1$-$C_4$alkyl group,
Me is chromium or cobalt,
Y is the $SO_3H$, COOH or $PO_3H_2$ group,
p is 1 or 2 and
n is an integer from 1 to 6,
and a grey dye of formula II

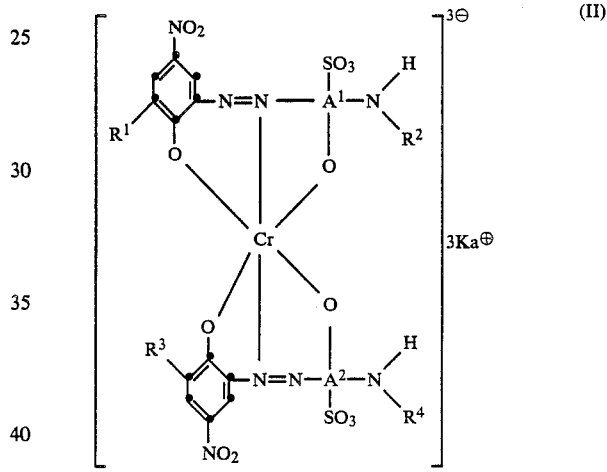

(II)

wherein
$R^1$ and $R^3$ are each independently of the other and at least one is sulfo,
$A^1$ and $A^2$ are each independently of the other the radical of 1-hydroxynaphthalene or 2-hydroxynaphthalene,
$R^2$ and $R^4$ are ech independently of the other hydrogen or a group of the formula —CO—(O)$_m$—E, in which E is $C_1$-$C_5$alkyl and m is 0 or 1, and
$Ka^{\oplus}$ is a cation.

2. A process according to claim 1, wherein in said grey dye of formula II, the radicals $A^1$ and $A^2$, each independently of the other, are derived from 1-hydroxynaphthalene-3-sulfonic acid or from 2-hydroxynaphthalene-4-sulfonic acid, the —$NHR^2$ and —$NHR^4$ groups being in the 6- or 7-position.

3. A process according to claim 1, wherein in said grey dye of formula II, $R^2$ and $R^4$ are each independently of the other hydrogen or acetyl.

4. A process according to claim 1, wherein in said gray dye of formula II, the radicals $A^1$ and $A^2$, each independently of the other, are derived from 1-hydroxy-7-aminonaphthalene-3-sulfonic acid, 1-hydroxy-6-aminonaphthalene-3-sulfonic acid, 2-hydroxy-6-aminonaphthalene-4-sulfonic acid or from the corresponding acetylamino compounds.

5. A process according to claim 1, wherein the gray dye is the 1:2-chromium complex of the dye of the formula

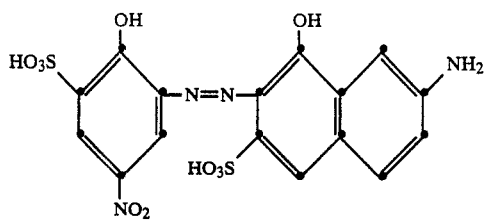

the 1:2-chromium complex of the dye of the formula

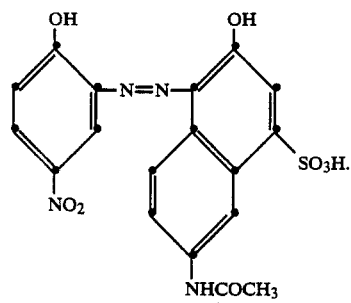

6. A process according to claim 1, wherein in said yellow dye and red dye each of formula I, X is oxygen.

7. A process according to claim 1, wherein in said yellow dye and red dye each of formula I, Y is the $SO_3$—H group.

8. A process according to claim 1, wherein in said yellow dye and red dye each of formula I, p is 1.

9. A process according to claim 1, wherein in said yellow dye and red dye each of formula I, n is 1 to 3, preferably 2.

10. A process according to claim 1, wherein in said yellow dye and red dye each of formula I, A and C are each independently of the other the radical of a 1-hydroxy-2-aminobenzene which is unsubstituted or substituted by one or more identical or different substituents selected from the series consisting of nitro, sulfo, chlorine, methyl or methoxy.

11. A process according to claim 10, wherein in said yellow dye and red dye each of formula I, A and C are each independently of the other the radical of a 1-hydroxy-2-aminobenzene which carries a nitro group in the 4- or 5-position, or are the radical of a 1-hydroxy-2-aminobenzene which carries a nitro group in the 4-position and a sulfo group in the 6-position, or are the radical of a 1-hydroxy-2-aminobenzene which carries a sulfo group in the 4-position and a nitro group in the 6-position.

12. A process according to claim 1, wherein in said yellow dye and red dye each of formula I, B and D are each independently of the other the radical of one of the following coupling components:
phenols which couple in the ortho-position and which are unsubstituted or substituted by low molecular alkyl or alkoxy, amino or acylamino; resorcinol; m-phenylenediamine, unsubstituted or substituted in the 4-position by sulfo, chloro, methyl or methoxy; naphthols which are unsubstituted or substituted by $C_1$–$C_4$alkyl or $C_1$–$C_4$alkoxy, chlorine, amino, acylamino or sulfo; 5-pyrazolones or 5-aminopyrazoles, which carry in the 1-position a phenyl or naphthyl radical, each unsubstituted or substituted by chlorine, nitro, $C_1$–$C_4$alkyl or $C_1$–$C_4$alkoxy groups or sulfo groups, and in the 3-position carry a $C_1$–$C_4$alkyl group, preferably a methyl group; acetoacetamides, acetoacetanilides and benzoylacetanilides which may be substituted in the anilide nucleus by chlorine, $C_1$–$C_4$alkyl or $C_1$–$C_4$alkoxy groups or sulfo groups; or 6-hydroxy-3-cyano- or 6-hydroxy-3-carbamoyl-4-alkyl-2-pyridones which are substituted in the 1-position by unsubstituted or substituted $C_1$–$C_4$alkyl, for example methyl, isopropyl, β-hydroxyethyl, β-aminoethyl or γ-isopropoxypropyl, or by phenyl, and in the 4-position can carry a $C_1$–$C_4$alkyl group, preferably methyl.

13. A process according to claim 12, wherein in said yellow dye and red dye each of formula I, B and D are each independently of the other the radical of one of the following coupling components: 1- or 2-naphthol which is unsubstituted or substituted by a sulfo group, or m-phenylenediamine, resorcinol, p-$C_1$-$C_6$alkylphenol, 1-phenyl-3-methyl-5-pyrazolone or acetoacetanilide, the phenyl moiety of which last two compounds may be substituted by $C_1$–$C_4$alkyl, $C_1$–$C_4$alkoxy, chlorine or sulfo.

14. A process according to claim 1, wherein in said yellow dye and red dye each of formula I, each of the two dyes is a symmetric 1:2-complex containing a total of 2 sulfo groups.

15. A process according to claim 1, wherein in said yellow dye and red dye each of the formula

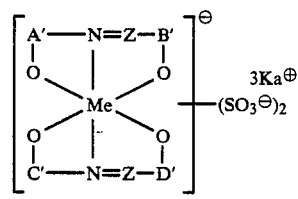

the substituents Z are each independently of the other nitrogen or a CH group,

A' and C' are each the radical of a 1-hydroxy-2-aminobenzene which carries a nitro group in the 4- or 5-position, or are the radical of a 1-hydroxy-2-aminobenzene which carries a nitro group in the 4-position and a sulfo group in the 6-position, or are the radical of a 1-hydroxy-2-aminobenzene which carries a nitro group in the 6-position and a sulfo group in the 4-position, B' and D' are each independently of the other the radical of one of the following coupling components if Z is nitrogen: 1- or 2-naphthol which is unsubstituted or substituted by a sulfo group, or m-phenylenediamine, resorcinol, p-$C_1$-$C_6$-alkylphenol, 1-phenyl-3-methyl-5-pyrazolone or acetoacetanilide, the phenyl moiety of which last two compounds may be substituted by $C_1$–$C_4$alkyl, $C_1$–$C_4$alkoxy, chlorine or sulfo, or, if Z is the CH group, are each independently of the other the radical of an o-hydroxybenzaldehyde or o-hydroxynaphthaldehyde, each of which may be substituted by phenylazo or sulfophenylazo, Me is cobalt or chromium and $Ka^\oplus$ is a cation.

16. A process according to claim 1, which comprises contacting the leather with a dye mixture containing (a) a gray 1:2 chromium complex of the formula II as indicated in claim 1, (b) a red or reddish brown 1:2-chromium or 1:2-cobalt complex of the dye of the formula

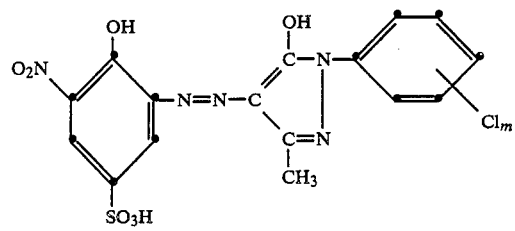
(VI)

wherein m is an integer from 0 to 2, and (c) a yellow 1:2-cobalt complex of the dye of the formula

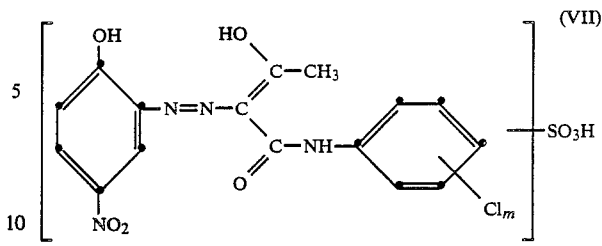
(VII)

wherein m is as defined above, or a yellowish brown 1:2-cobalt or 1:2-chromium complex of the dye of the formula (VIII)

wherein m is as defined above.

17. A process according to claim 1, which comprises contacting the leather with a a dye bath which additionally contains a colour-intensifying assistant.

18. A process according to claim 17, wherein the colour-intensifying assistant is an ethoxylated alkylamine.

19. Leather or furs which have been dyed by a process as claimed in claim 1.

* * * * *